US012600270B2

(12) United States Patent
Chen

(10) Patent No.: US 12,600,270 B2
(45) Date of Patent: Apr. 14, 2026

(54) CARRYCOT TO BE DETACHABLY MOUNTED ON A BASE BEING DISMOUNTABLY ATTACHED IN A VEHICLE OR ON A STROLLER FRAME

(71) Applicant: BAMBINO PREZIOSO SWITZERLAND AG, Steinhausen (CH)

(72) Inventor: Yingzhong Chen, Dongguan (CN)

(73) Assignee: BAMBINO PREZIOSO SWITZERLAND AG, Steinhausen (CH)

( * ) Notice: Subject to any disclaimer, the term of this patent is extended or adjusted under 35 U.S.C. 154(b) by 0 days.

(21) Appl. No.: 17/924,910

(22) PCT Filed: May 12, 2021

(86) PCT No.: PCT/EP2021/062629
§ 371 (c)(1),
(2) Date: Nov. 11, 2022

(87) PCT Pub. No.: WO2021/228941
PCT Pub. Date: Nov. 18, 2021

(65) Prior Publication Data
US 2023/0182626 A1 Jun. 15, 2023

(30) Foreign Application Priority Data
May 14, 2020 (CN) ......................... 202010406407.X

(51) Int. Cl.
*B60N 2/28* (2006.01)
(52) U.S. Cl.
CPC ......... *B60N 2/2812* (2013.01); *B60N 2/2821* (2013.01); *B60N 2/2845* (2013.01); *B60N 2/2848* (2013.01); *B60N 2/2854* (2013.01)

(58) Field of Classification Search
CPC .. B60N 2/2812; B60N 2/2821; B60N 2/2845; B60N 2/2848; B60N 2/2854
See application file for complete search history.

(56) References Cited

U.S. PATENT DOCUMENTS 4,707,024 A   11/1987  Schrader
4,921,261 A *  5/1990  Sadler, Jr. ................. B62B 7/06
                                                    280/30
(Continued)

FOREIGN PATENT DOCUMENTS

CN      1365906 A     8/2002
CN      1681684 A     10/2005
(Continued)

OTHER PUBLICATIONS

International Search Report and Written Opinion issued in corresponding International Application No. PCT/EP2021/062629, dated Aug. 20, 2021, pp. 1-11, European Patent Office, Rijswijk, Netherlands.

(Continued)

*Primary Examiner* — Philip F Gabler
(74) *Attorney, Agent, or Firm* — HAUPTMAN HAM, LLP

(57) ABSTRACT

A carrycot is provided and includes a carrycot body and a mounting bracket. The carrycot body is for accommodating a child and further for a harness to pass therethrough. The mounting bracket is disposed on an outer surface of the carrycot body and includes a bracket body, an engaging component and a mounting assembly. The engaging component is for positioning the carrycot. The mounting assembly is for the harness to be coupled to. The harness is coupled to the mounting assembly and passes through the carrycot body to stretch into an interior of the carrycot body for achieving an installation of the harness. The carrycot has advantages of simple structure and easy operation. Further- (Continued)

1000

100 more, a carrycot structure including the carrycot, and a child carrier including the carrycot are provided.

23 Claims, 7 Drawing Sheets

(56)                References Cited

U.S. PATENT DOCUMENTS

| | | | | | |
|---|---|---|---|---|---|
| 5,496,092 | A * | 3/1996 | Williams | ............. | B60N 2/2812 297/256.13 |
| 6,923,467 | B2 * | 8/2005 | Hsia | ........................ | B62B 7/145 280/47.38 |
| 6,986,518 | B1 | 1/2006 | Besaw | | |
| 7,861,341 | B2 * | 1/2011 | Ayette | .................... | A61G 1/044 5/628 |
| 8,276,985 | B2 * | 10/2012 | Kho | ........................ | A47D 9/016 280/47.38 |
| 8,876,208 | B2 * | 11/2014 | Heisey | ................. | B60N 2/2827 297/130 |
| 9,610,966 | B2 * | 4/2017 | Zhong | ..................... | B62B 7/142 |
| 10,023,218 | B2 * | 7/2018 | Paxton | .................... | B62B 7/142 |
| 11,034,266 | B2 * | 6/2021 | Heisey | ................. | B60N 2/2863 |
| 11,134,793 | B2 * | 10/2021 | Smith | ................... | A47D 13/025 |
| 2003/0075903 | A1 | 4/2003 | Hsia | | |
| 2008/0313812 | A1 * | 12/2008 | Reeves | ................. | A47D 13/02 5/655 |
| 2011/0062752 | A1 | 3/2011 | Kho et al. | | |
| 2019/0263298 | A1 | 8/2019 | Gay et al. | | |
| 2023/0182625 | A1 * | 6/2023 | Chen | .................... | B60N 2/2854 297/250.1 |

FOREIGN PATENT DOCUMENTS

| | | | |
|---|---|---|---|
| CN | 103568893 | A | 2/2014 |
| CN | 103859877 | A | 6/2014 |
| CN | 204279148 | U | 4/2015 |
| CN | 205853937 | U | 1/2017 |
| CN | 108189891 | A | 6/2018 |
| CN | 108433443 | A | 8/2018 |
| CN | 109532584 | A | 3/2019 |
| CN | 109843642 | A | 6/2019 |
| CN | 109843643 | A | 6/2019 |
| CN | 210027122 | U | 2/2020 |
| EP | 3400150 | A1 | 11/2018 |
| JP | S52129117 | A | 10/1977 |
| JP | 2002293176 | A | 10/2002 |
| JP | 2014133548 | A | 7/2014 |
| KR | 101447702 | B1 | 10/2014 |
| WO | 2017/103122 | A1 | 6/2017 |
| WO | 2017/118667 | A1 | 7/2017 |
| WO | 2018/007243 | A1 | 1/2018 |
| WO | WO 2018007243 | * | 1/2018 |
| WO | 2020072944 | A1 | 4/2020 |

OTHER PUBLICATIONS

First Office Action in Corresponding Chinese Application No. 202010406407.X, dated Dec. 14, 2022; 11 pgs.

Notice of Allowance in Corresponding Chinese Application No. 202010406407.X, dated Nov. 3, 2023; 4 pgs.

Notice of Allowance in Corresponding Taiwan Application No. 113128009, dated Nov. 29, 2024; 4 pgs.

Search Report in Corresponding Japanese Patent Application No. 2022-562418, dated Sep. 15, 2023; 35 pgs.

Second Office Action in Corresponding Chinese Application No. 202010406407.X, dated Jun. 10, 2023; 13 pgs.

Search Report in Corresponding Japanese Application No. 2025-066607, dated Feb. 20, 2026; 27 pgs.

* cited by examiner

1000

1000

100

20

20

200

CARRYCOT TO BE DETACHABLY MOUNTED ON A BASE BEING DISMOUNTABLY ATTACHED IN A VEHICLE OR ON A STROLLER FRAME

CROSS REFERENCE TO RELATED APPLICATIONS

This is a 371 U.S. National Phase of International Application No. PCT/EP2021/062629, filed on May 12, 2021, which claims the benefit of CN Patent Application No. 202010406407.X, filed on May 14, 2020, and the contents of this application are incorporated herein by reference.

FIELD

One or more embodiments of the present invention relates to a carrycot, a carrycot structure, and a child carrier according to at least claims 1, 19 and 22.

BACKGROUND

Carrycots are one of juvenile products that can be installed on strollers or vehicle seats to provide comfortable and safe sleeping environments for children, and to help caregivers to look after the children. However, conventional carrycots cannot be used universally. In other words, the carrycots designed for strollers cannot be installed on vehicle seats, and the carrycots designed for vehicle seats cannot be installed on strollers. Therefore, the caregivers would need different carrycots in different situations, this is inconvenient for the caregivers. Furthermore, most of the conventional carrycots have complicated structure and difficult attachment and detachment operations, and therefore, they are not easy to use.

SUMMARY

Therefore, one or more embodiments of the present invention aims to provide a carrycot that is easy to use and has a universal design adapted for a stroller and a vehicle seat. One or more embodiments of the invention aims to provide a carrycot structure that has simple structure and is adapted for various vehicle seats. One or more embodiments of the present invention also aims to provide a child carrier having the carrycot.

This is achieved by a carrycot, a carrycot structure, and a child carrier according to at least claims 1, 19 and 22. The dependent claims pertain to corresponding further developments and improvements.

As will be seen more clearly from the detail description, the claimed carrycot includes a carrycot body and a mounting bracket. The carrycot body is for accommodating a child and for a harness to pass through. The mounting bracket is disposed on an outer surface of the carrycot body. The mounting bracket includes a bracket body, at least one engaging component and a mounting assembly. The at least one engaging component is for positioning the carrycot. The mounting assembly is for the harness to be coupled to. The harness is coupled to the mounting assembly and passes through the carrycot body.

According to an embodiment of the present invention, the at least one engaging component includes an engaging portion protruding from the bracket body for positioning the carrycot body.

According to an embodiment of the present invention, a fixing portion is formed on at least one end of the at least one engaging component and is affixed to the bracket body.

According to an embodiment of the present invention, the at least one engaging component is a rod-shaped structure.

According to an embodiment of the present invention, the at least one engaging component and the mounting bracket are integrally formed with each other.

According to an embodiment of the present invention, an installation slot is formed on the carrycot for cooperating with the mounting bracket, and the bracket body is installed on the installation slot.

According to an embodiment of the present invention, the mounting bracket includes a plurality of pipes.

According to an embodiment of the present invention, the bracket body includes a bottom pipe and at least one lateral pipe. The bottom pipe is disposed on a bottom portion of the carrycot body. The at least one lateral pipe is disposed on a lateral portion of the carrycot body, and the at least one engaging component is disposed on the bottom pipe.

According to an embodiment of the present invention, the bottom pipe and the at least one lateral pipe are integrally formed with each other.

According to an embodiment of the present invention, the carrycot further includes a handle movably disposed on the carrycot body or the mounting bracket.

According to an embodiment of the present invention, the mounting assembly includes a shoulder strap mount and a crotch strap mount for mounting a shoulder strap and a crotch strap of the harness respectively.

According to an embodiment of the present invention, at least one first shoulder strap hole is formed on the shoulder strap mount. At least one second shoulder strap hole is formed on a bottom portion of the carrycot body, and the at least one first shoulder strap hole is aligned with the at least one second shoulder strap hole.

According to an embodiment of the present invention, at least one first crotch strap hole is formed on the crotch strap mount. At least one second crotch strap hole is formed on a bottom portion of the carrycot body, and the at least one first crotch strap hole is aligned with the at least one second crotch strap hole.

According to an embodiment of the present invention, the mounting bracket further includes at least one fixing component for restraining the at least one engaging component, and the at least one fixing component includes two fixing blocks respectively disposed on two ends of the at least one engaging component.

According to an embodiment of the present invention, the at least one fixing component includes a first fixing component and a second fixing component. The mounting bracket further includes at least one reinforcing component. The at least one reinforcing component is disposed between one of two fixing blocks of the first fixing component and one of two fixing blocks of the second fixing component, so that the one of two fixing blocks of the first fixing component is affixed to the one of two fixing blocks of the second fixing component by the at least one reinforcing component.

According to an embodiment of the present invention, the mounting bracket further includes at least one supporting block disposed on an end of the bottom pipe away from the at least one engaging component, and a height of the at least one supporting block from the bracket body is equal to a height of each of the two fixing blocks from the bracket body, so that the carrycot body is supported in a horizontal direction by the at least one supporting block and the two fixing blocks cooperatively.

According to an embodiment of the present invention, the mounting bracket further includes at least one auxiliary reinforcing component disposed between the mounting assembly and the bracket body, so that the mounting assembly is affixed to the bracket body by the at least one auxiliary reinforcing component.

According to an embodiment of the present invention, the carrycot body is made of foam material.

According to an embodiment of the present invention, a longitudinal direction of the at least one engaging component is parallel to a longitudinal direction of the carrycot body.

Besides, the claimed carrycot structure for a vehicle seat includes abase and the carrycot of any one of the aforementioned embodiments, and the carrycot is detachably installed on the base.

According to an embodiment of the present invention, at least one locking component protrudes from the base and is for cooperating with the at least one engaging component, and a locking slot is formed on the at least one locking component and for engaging with the at least one engaging component.

According to an embodiment of the present invention, at least one restraining block protrudes from the base and is for restraining a movement of the carrycot relative to the base.

Furthermore, the claimed child carrier includes a carrier frame and the carrycot of any one of the aforementioned embodiments, and the carrycot is detachably installed on the carrier frame.

According to an embodiment of the present invention, the carrycot further includes at least one first connecting component. The carrier frame includes at least one second connecting component for cooperating with the at least one first connecting component. The carrycot is detachably installed on the carrier frame by a cooperation of the at least one first connecting component and the at least one second connecting component.

According to an embodiment of the present invention, the at least one first connecting component is disposed on the carrycot body or the mounting bracket.

According to an embodiment of the present invention, the carrier frame is a stroller frame or a crib frame.

Comparing with other approaches, in one or more embodiments of the present invention, the engaging component is used for positioning the carrycot body, and the mounting assembly is used for installing the harness. Therefore, the advantages of one or more embodiments of the present invention are simple structure and easy operation. One or more embodiments of the present invention also provides a comfortable and safe environment for the child. Besides, the carrycot provided by one or more embodiments of the present invention can be adapted for installing on various vehicle seats, such as car seats, ship seats or aircraft seats. The carrycot provided by one or more embodiments of the present invention can also be adapted for installing on various carrier frames, such as stroller frames or crib frame. Therefore, the carrycot provided by one or more embodiments of the present invention is versatile. Furthermore, in one or more embodiments of the present invention, the carrycot body can be made of foam material, and the mounting bracket includes the pipes. Thus, the structure of the carrycot provided by one or more embodiments of the present invention is stable, compact, and lightweight.

These and other objectives of one or more embodiments of the present invention will no doubt become obvious to those of ordinary skill in the art after reading the following detailed description of the preferred embodiment that is illustrated in the various figures and drawings.

BRIEF DESCRIPTION OF THE DRAWINGS

In the following, the invention is further illustrated by way of example, taking reference to the accompanying drawings. Thereof

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "right", "left", "front", "back", etc., is used with reference to the orientation of the Figure(s) being described. The components of one or more embodiments of the present invention can be positioned in a number of different orientations. As such, the directional terminology is used for purposes of illustration and is in no way limiting. Accordingly, the drawings and descriptions will be regarded as illustrative in nature and not as restrictive. Also, the term "connect" is intended to mean either an indirect or direct mechanical connection. Thus, if a first device is connected to a second device, that connection may be through a direct mechanical connection, or through an indirect mechanical connection via other devices and connections.

In order to illustrate technical specifications and structural features as well as achieved purposes and effects of the present invention, relevant embodiments and figures are described as follows.

Figure 1:
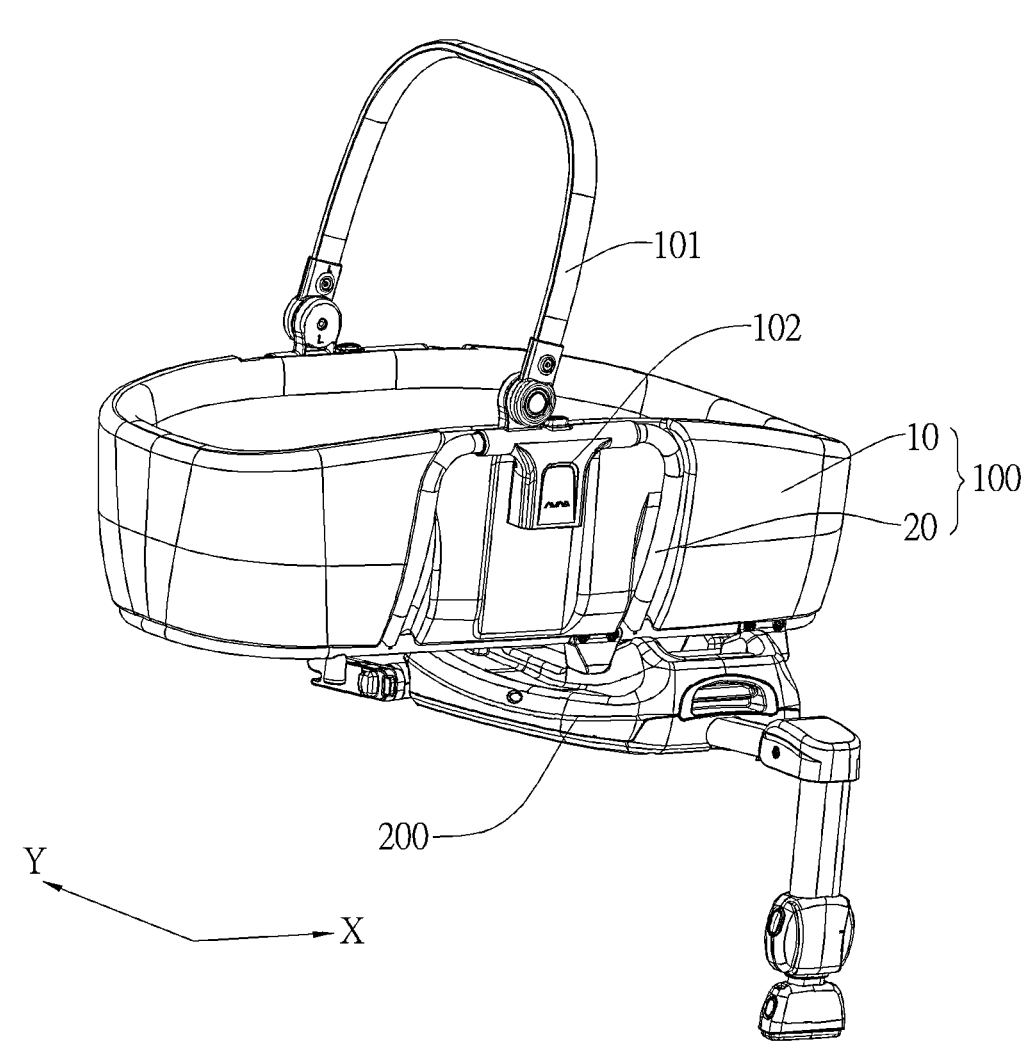
FIG. 1 and FIG. 2 are diagrams of a carrycot structure in different views according to an embodiment of the present invention.
Figure 2:
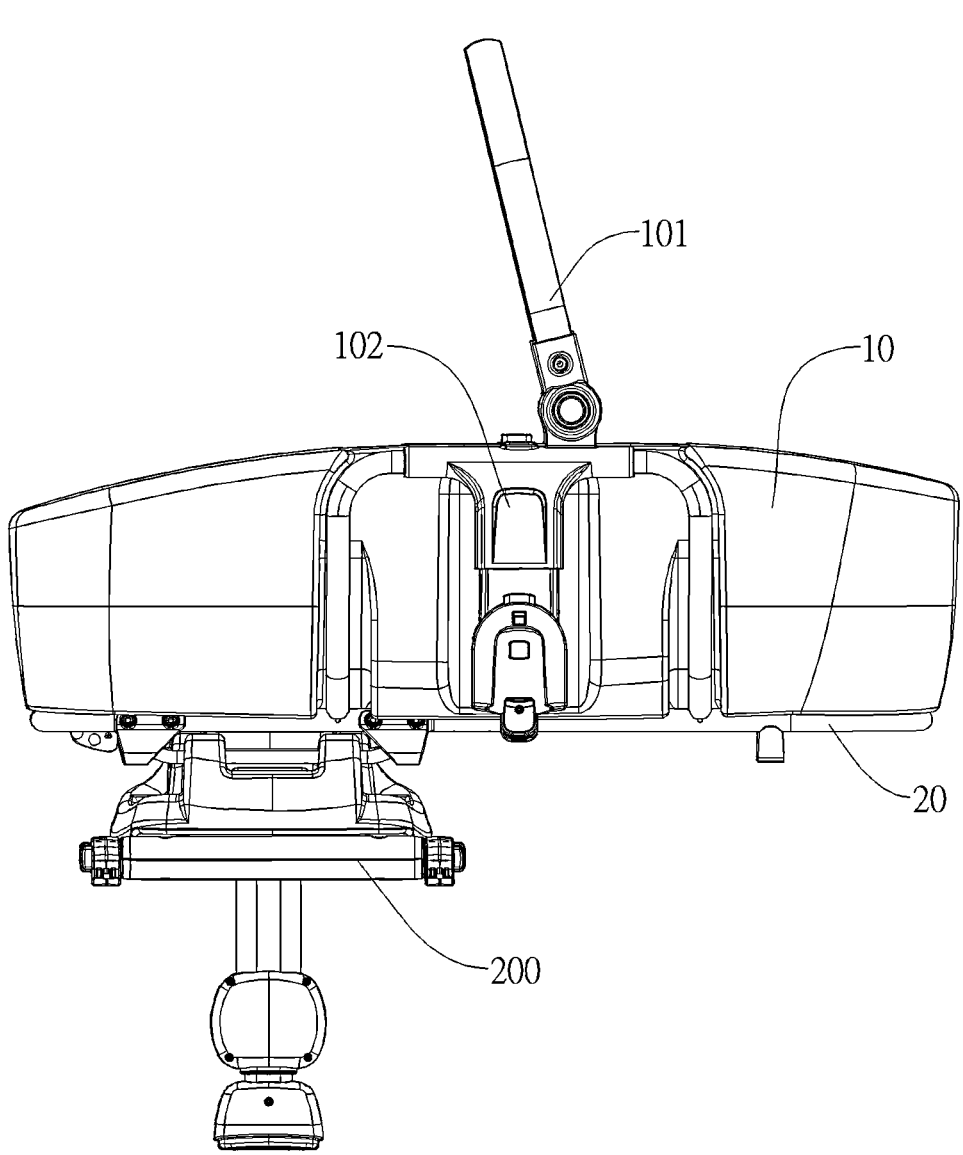
Figure 3:
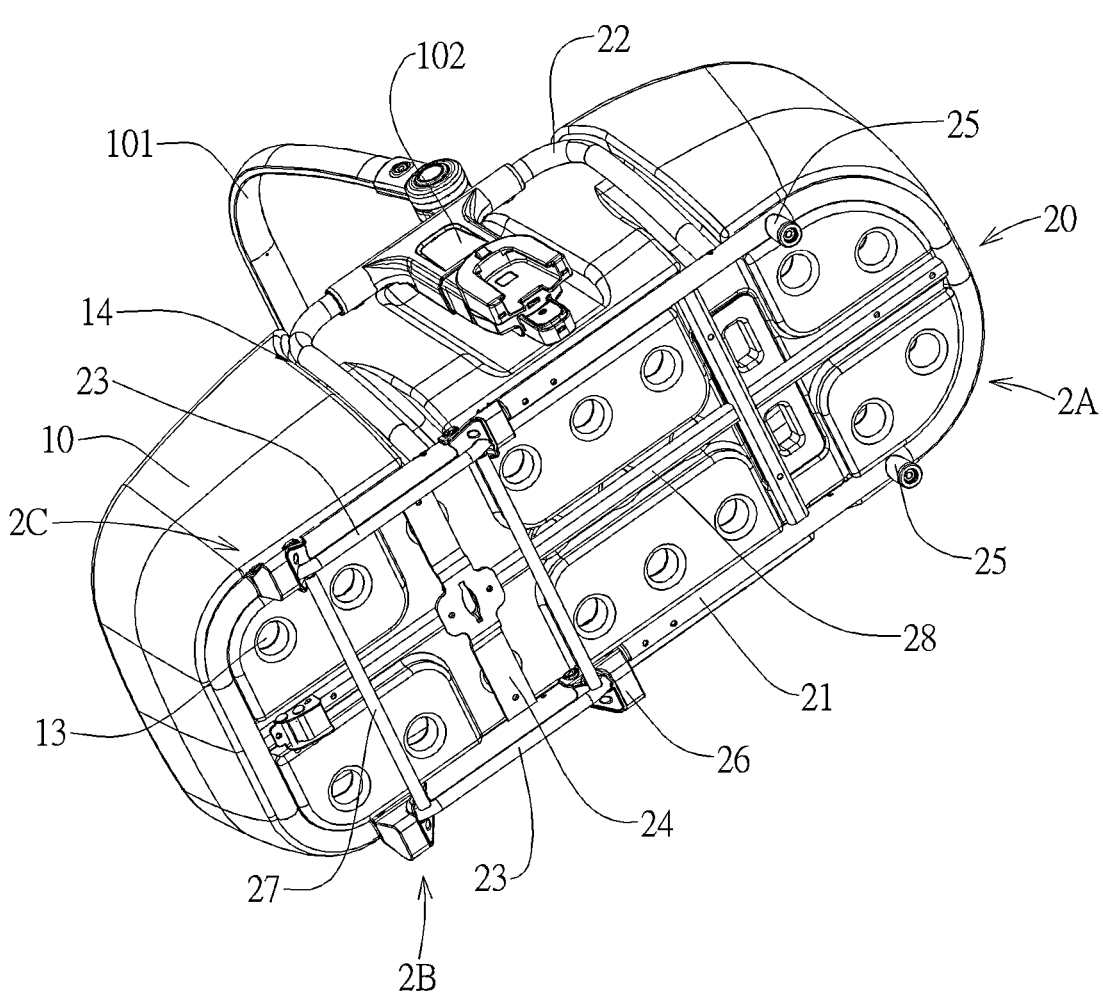
FIG. 3 and FIG. 4 are diagrams of a carrycot in different views according to the embodiment of the present invention.
Figure 4:
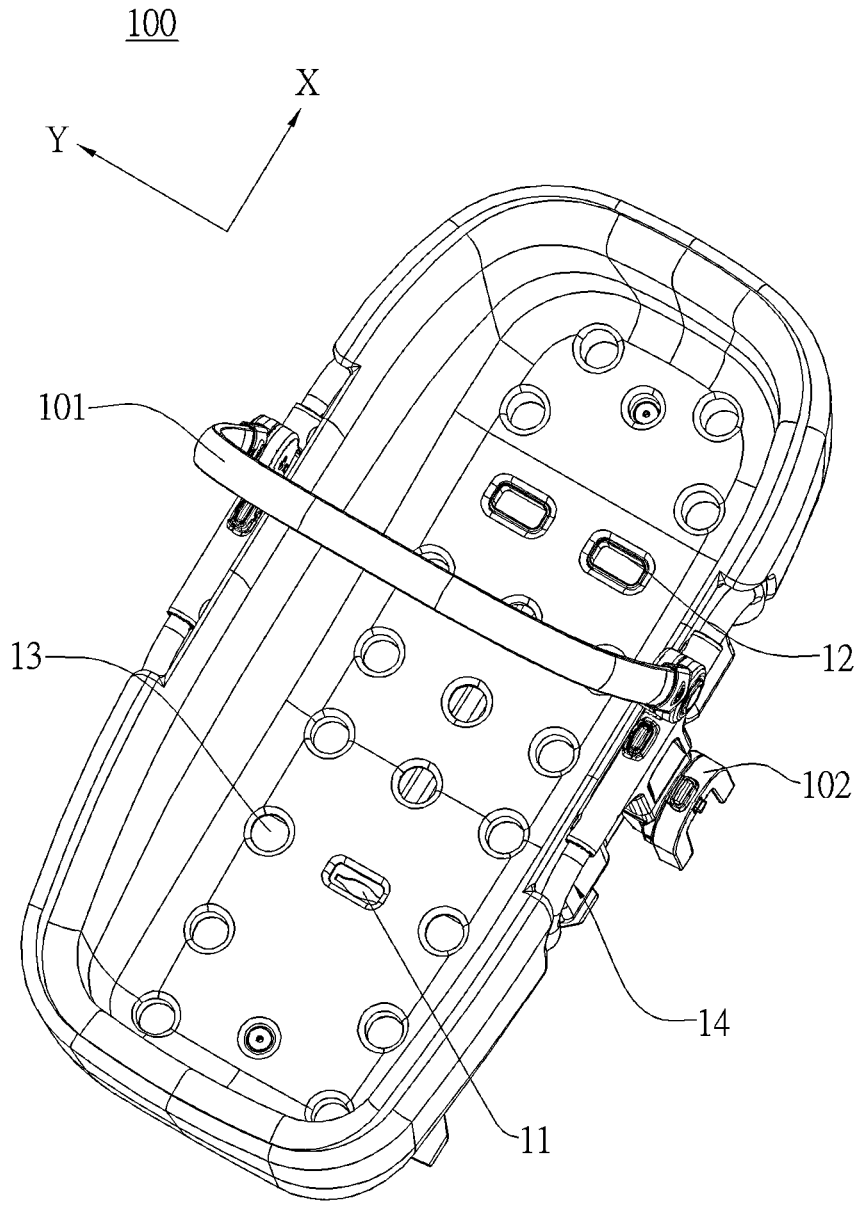
Figure 5:
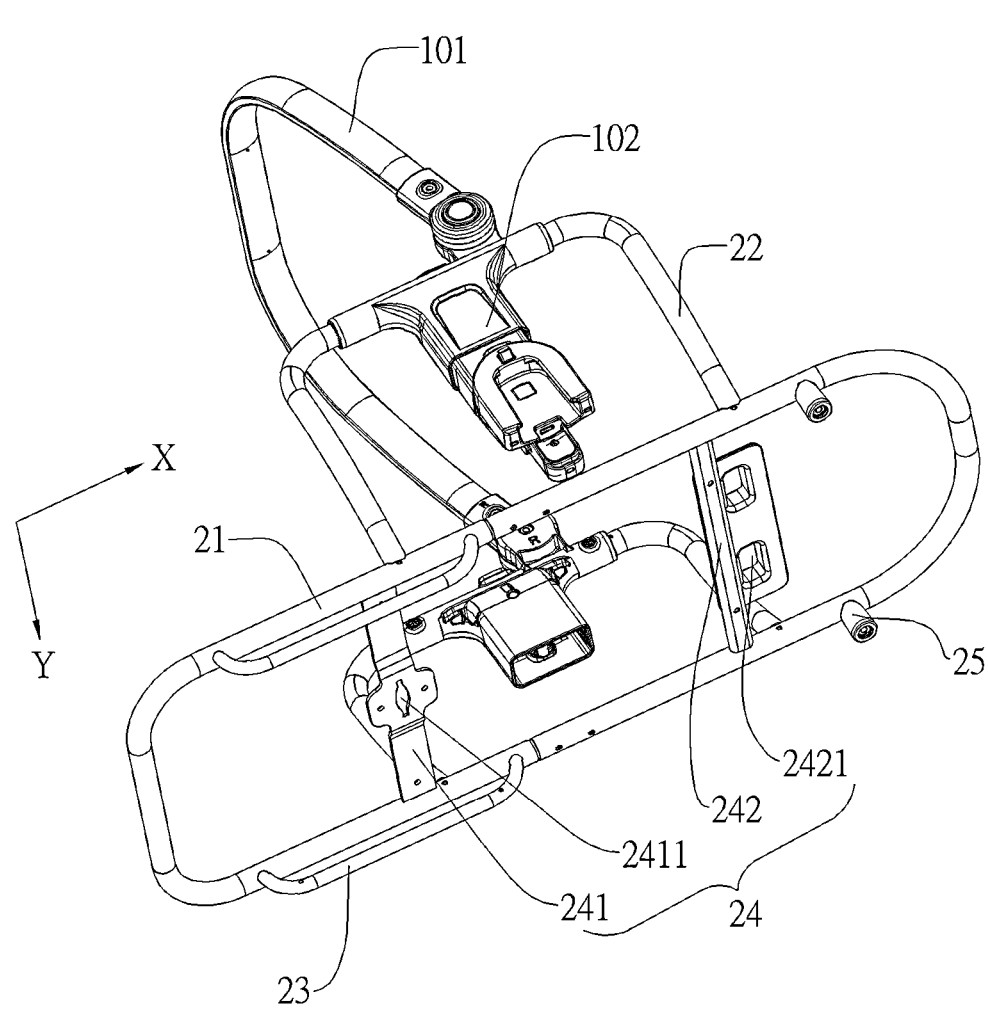
FIG. 5 is a partial view of the carrycot according to the embodiment of the present invention.
Figure 6:
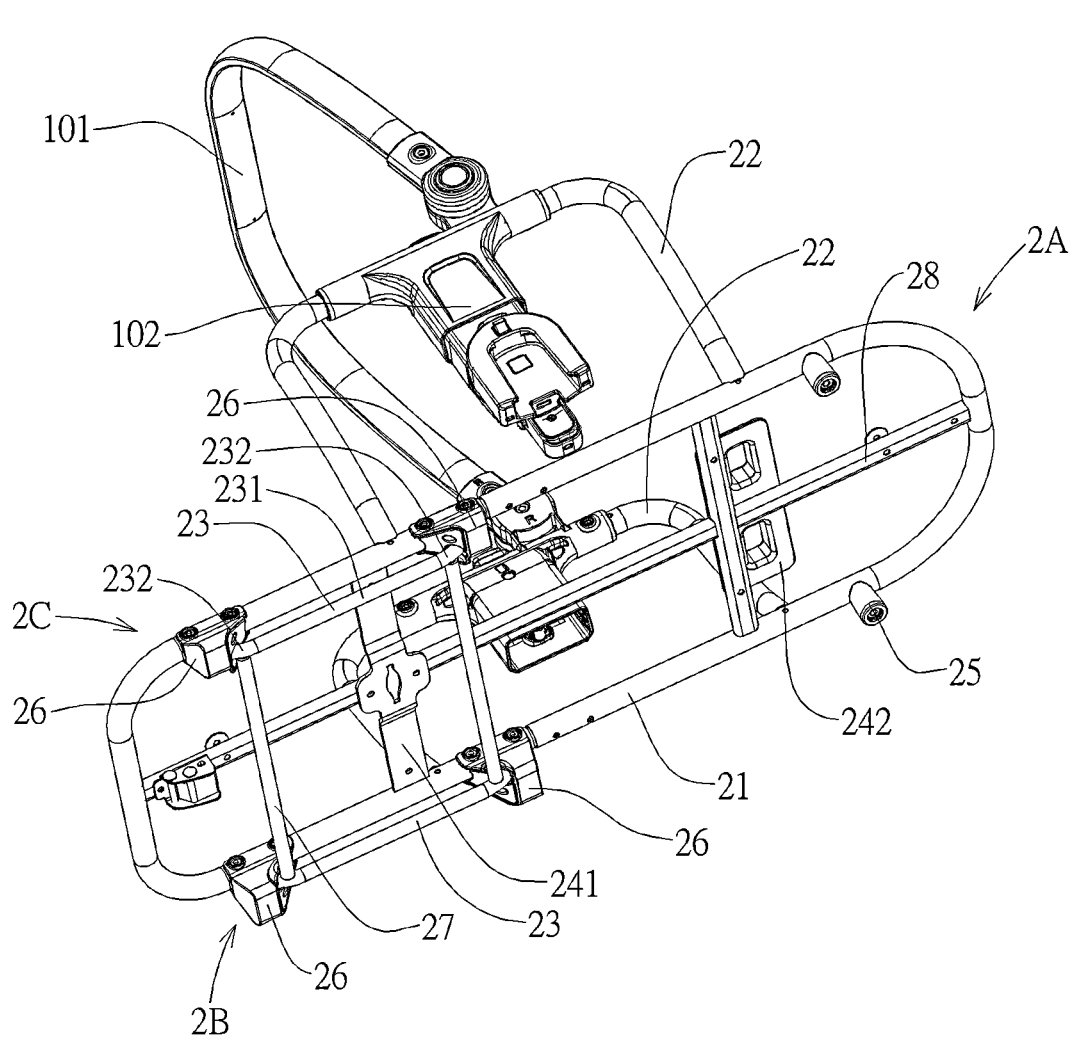
FIG. 6 is another partial view of the carrycot according to the embodiment of the present invention.
Figure 7:
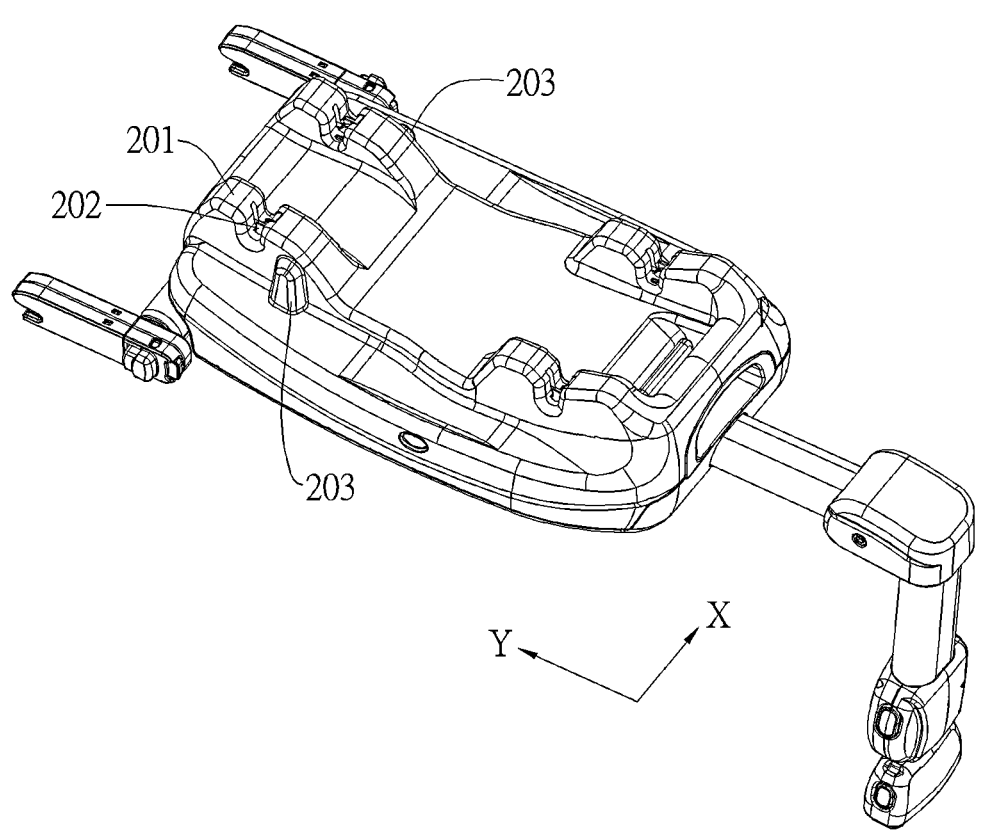
FIG. 7 is a diagram of a base according to the embodiment of the present invention.

Please refer to FIG. 1 to FIG. 7. FIG. 1 and FIG. 2 are diagrams of a carrycot structure 1000 in different views according to an embodiment of the present invention. FIG. 3 and FIG. 4 are diagrams of a carrycot 100 in different views according to the embodiment of the present invention. FIG. 5 is a partial view of the carrycot 100 according to the embodiment of the present invention. FIG. 6 is another partial view of the carrycot 100 according to the embodiment of the present invention. FIG. 7 is a diagram of a base 200 according to the embodiment of the present invention. As shown in FIG. 1 to FIG. 7, the carrycot structure 1000 includes the carrycot 100 and the base 200. The base 200 can be installed on a vehicle seat, such as a car seat, a ship seat, or an aircraft seat. The carrycot 100 is detachably mounted on the base 200. The carrycot 100 includes a carrycot body 10 and a mounting bracket 20. The carrycot body 10 is for accommodating a child and can allow a harness to pass through. The mounting bracket 20 is disposed on an outer surface of the carrycot body 10. Specifically, the mounting bracket 20 includes a bracket body 2A, two engaging components 23 and a mounting assembly 24. The two engaging components 23 can be detachably engaged with the base 200, so that the carrycot body 10 can be detachably installed on the base 200 for achieving positioning of the carrycot body 10. The harness can be coupled to the mounting assembly 24, and passed through the carrycot body 10, and stretched into an interior of the carrycot body 10. However, the number of the engaging component is not limited to this embodiment. For example, in another embodiment, the mounting bracket can include only one engaging component.

As shown in FIG. 1, FIG. 3, FIG. 5 and FIG. 6, each of the engaging components 23 includes an engaging portion 231 for positioning the carrycot body 10. Each of the engaging portions 231 protrudes from the bracket body 2A and spaced apart from the bracket body 2A by a gap. The aforementioned configuration allows more convenient engagements between the engaging components 23 and the base 200 more convenient, therefore would be easier to use.

Furthermore, as shown in FIG. 3, FIG. 5 and FIG. 6, a fixing portion 232 is formed on each end of each of the engaging components 23 and is affixed to the bracket body 2A, so that each of the engaging portions 231 can be fixed on the bracket body 2A by the corresponding fixing portion 232. In order to make an overall structure stable, the two fixing portions 232 at the two ends of each of the engaging components 23 can be integrally formed with the corresponding engaging portion 231 at a middle portion of each of the engaging components 23, and the two fixing portions 232 of each of the engaging components 23 can be integrally formed with the bracket body 2A. Specifically, in order to make the overall structure reasonably compact, each of the engaging components 23 can be a curved rod-shaped structure, so that the middle portion of each of the engaging components 23 can form the corresponding engaging portion 231, and the two ends of each of the engaging components 23 can form the two corresponding fixing portions 232. However, the structure of the engaging component is not limited to this embodiment. For example, in another embodiment, the fixing portion can be fixed onto the bracket body by engaging, screwing or welding, and the engaging portion can be fixed onto the fixing portion by engaging, screwing or welding. Alternatively, in another embodiment, the engaging component can be formed in another shape, e.g., the engaging component can be an engaging block with an engaging recess.

Alternatively, as shown in FIG. 3 to FIG. 6, the mounting bracket 20 is disposed on the outer surface of the carrycot body 10. Specifically, an installation slot 14 is formed on the carrycot body 10 and for cooperating with the mounting bracket 20. The bracket body 2A is installed on the installation slot 14. By a cooperation between the bracket body 2A and the installation slot 14, a connection of the mounting bracket 20 and the carrycot body 10 can be more stable.

As shown in FIG. 5 and FIG. 6, the mounting bracket 20 includes a plurality of pipes. The pipes can be a plurality of metal pipes. The plurality of metal pipes can be fabricated individually and installed on the carrycot body 10 individually after fabrication, or can be welded together after fabrication and then be installed on the carrycot body 10 after being welded together. The mounting bracket 20 with the plurality of metal pipes makes the overall structure stable and compact, but also makes an installation of the mounting bracket 20 more convenient. However, the present invention is not limited to this embodiment. For example, in another embodiment, the plurality of pipes can be a plurality of plastic pipes, and the plurality of plastic pipes can be integrally formed together.

Specifically, as shown in FIG. 5 and FIG. 6, the bracket body 2A includes a bottom pipe 21 and two lateral pipes 22. The bottom pipe 21 is disposed on a bottom portion of the carrycot body 10. The two lateral pipes 22 are respectively disposed on two lateral portions of the carrycot body 10. The two engaging components 23 are disposed on the bottom pipe 21. The two engaging components 23 can be integrally formed with the bottom pipe 21. By the aforementioned configuration of the bottom pipe 21 and the two lateral pipes 22, structure of the carrycot 100 can be more stable. However, the structure of the bracket body is not limited to this embodiment. For example, in another embodiment, the bracket body can include only one lateral pipe at one lateral portion of the carrycot body.

In addition, as shown in FIG. 1 to FIG. 6, the carrycot 100 further includes a handle 101 movably disposed on the mounting bracket 20. Specifically, the handle 101 is pivotally connected to the lateral pipes 22 of the mounting bracket 20, i.e., the handle 101 is pivotally installed on the carrycot body 10 by the mounting bracket 20. By the aforementioned configuration of the handle 101, a user can carry or transport the carrycot 100 with the child easily by holding the handle 101, or pivotally fold the handle 101 to abut against the carrycot body 10 for reducing an occupied space of the carrycot 100 when it is not required to carry or transport the carrycot 100. However, the structure of the handle is not limited to this embodiment. For example, in another embodiment, the handle can be movably and directly connected to the carrycot body.

As shown in FIG. 3, FIG. 5 and FIG. 6, the mounting assembly 24 includes a shoulder strap mount 242 and a crotch strap mount 241 for mounting a shoulder strap and a crotch strap of the harness respectively, so as to allow the shoulder strap and the crotch strap of the harness to pass through the carrycot body 10 to stretch into the interior of the carrycot body 10 easily. Therefore, with the aforementioned configuration of the shoulder strap mount 242 and the crotch strap mount 241, the present invention can provide a comfortable and safe environment for a child inside the carrycot body 10.

Specifically, as shown in FIG. 3 to FIG. 6, two first shoulder strap holes 2421 are formed on the shoulder strap mount 242. Two second shoulder strap holes 12 are formed on the bottom portion of the carrycot body 10. The two first shoulder strap holes 2421 are respectively aligned with the two second shoulder strap holes 12, so that the shoulder strap can pass through the two first shoulder strap holes 2421 and the two second shoulder strap holes 12 to stretch into the interior of the carrycot body 10 easily. A first crotch strap hole 2411 is formed on the crotch strap mount 241. A second crotch strap hole 11 is formed on the bottom portion of the carrycot body 10. The first crotch strap hole 2411 is aligned with the second crotch strap hole 11, so that the crotch strap can pass through the first crotch strap hole 2411 and the second crotch strap hole 11 to stretch into the interior of the carrycot body 10 easily. However, the numbers of the first shoulder strap hole, the second shoulder strap hole, the first crotch strap hole and the second crotch strap hole are not limited to this embodiment, and the numbers would depend on practical designs of the shoulder strap and the crotch strap. For example, in another embodiment, there can be only one first shoulder strap hole formed on the shoulder strap mount and only one second shoulder strap hole formed on the bottom portion of the carrycot body. Alternatively, in another embodiment, there can be two first crotch strap holes formed on the crotch strap mount and two second crotch strap holes formed on the bottom portion of the carrycot body.

As shown in FIG. 3 and FIG. 6, the mounting bracket 20 further includes a first fixing component 2B and a second fixing component 2C for respectively restraining the two engaging components 23. Each of the first fixing component 2B and the second fixing component 2C includes two fixing blocks 26 respectively disposed on the two ends of the corresponding engaging component 23. The fixing blocks 26 can not only make connections of the engaging components 23 and the bracket body 2A stable but also restrain a movement of the carrycot 100 relative to the base 200 by abutting against the base 200. By restraining the relative movement between the carrycot 100 and the base 200, the restraining blocks 26 ensures the safe use of the carrycot 100 when the two engaging components 23 engage with the base 200.

Furthermore, as shown in FIG. 3 and FIG. 6, the mounting bracket 20 further includes two reinforcing components 27. Each of the reinforcing components 27 is disposed between a corresponding one of the two fixing blocks 26 of the first fixing component 2B and a corresponding one of the two fixing blocks 26 of the second fixing component 2C, so that the corresponding one of the two fixing blocks 26 of the first fixing component 2B is affixed to the corresponding one of the two fixing blocks 26 of the second fixing component 2C by the corresponding reinforcing component 27. The reinforcing components 27 can not only make the overall structure more stable and but also restrain the movement of the carrycot 100 relative to the base 200 by abutting against the base 200. By restraining the relative movement between the carrycot 100 and the base 200, the reinforcing component 27 ensures the safe use of the carrycot 100 when the two engaging components 23 engage with the base 200. Specifically, each of the reinforcing components 27 can be a rod-shaped structure. However, the structure of the mounting bracket is not limited to this embodiment. For example, in another embodiment, the reinforcing component can be a block-shaped structure. Alternatively, in another embodiment, the mounting bracket can include only one reinforcing component disposed between the two corresponding fixing blocks. Alternatively, in another embodiment, the mounting bracket can include only one of the first fixing component and the second fixing component, i.e., there can be only one fixing component.

Besides, as shown in FIG. 3 and FIG. 6, the mounting bracket 20 further includes an auxiliary reinforcing component 28 disposed between the mounting assembly 24 and the bracket body 2A, and affixed to the mounting assembly 24 and the bracket body 2A for making the overall structure more stable. Specifically, the auxiliary reinforcing component 28 is disposed between the shoulder strap mount 242, the crotch strap mount 241 and the bracket body 2A. However, the present invention is not limited to this embodiment. For example, in another embodiment, the mounting bracket can include a plurality of auxiliary reinforcing components separately disposed between the shoulder strap mount and the bracket body and/or between the crotch strap mount and the bracket body.

Moreover, as shown in FIG. 3, FIG. 5 and FIG. 6, the mounting bracket 20 further includes two supporting blocks 25 disposed on an end of the bottom pipe 21 away from the two engaging components 23. A height of each of the supporting blocks 25 from the bracket body 2A is equal to a height of each of the fixing blocks 26 from the bracket body 2A. Therefore, the supporting blocks 25 and the fixing blocks 26 can cooperatively support the carrycot body 10 in a horizontal direction. When the carrycot 100 is independently used, e.g., when the carrycot 100 is placed on a ground or a desktop, the aforementioned configuration is to prevent injuries of the child in the carrycot body 10 due to unintentional tipping of the carrycot body 10. However, the number of the supporting block is not limited to this embodiment. For example, in another embodiment, the mounting bracket can include only one supporting block.

As shown in FIG. 1 to FIG. 3, in order to make the overall structure stable but not bulky, the carrycot body 10 can be made of foam material. By cooperation of the carrycot body 10 made of foam material and the mounting bracket 20 including the metal pipes, the structure of the carrycot 100 is stable and lightweight. Furthermore, a plurality of through holes 13 can be formed on the carrycot body 10, which can not only achieve a purpose of ventilation and breathability but also reduce the weight of the carrycot body 10 for bringing convenience in use and transportation.

As shown in FIG. 7, two locking components 201 protrude from the base 200 and respectively cooperate with the two engaging components 23. A locking slot 202 is formed on each of the locking components 201 and for engaging with the corresponding engaging component 23. Each of the locking components 201 can be a protruding structure, and each of the locking slots 202 can be a recess structure, so that an engagement of each of the engaging components 23 with the base 200 is convenient. However, the number of the locking component is not limited to this embodiment. For example, in another embodiment, there can be only one locking component protruding from the base.

Besides, as shown in FIG. 1 and FIG. 4 to FIG. 7, two restraining blocks 203 protrude from the base 200 and for restraining the movement of the carrycot 100 relative to the base 200. Specifically, when each of the engaging components 23 engages with the corresponding locking slot 202, each of the locking components 201 can abut against the corresponding fixing blocks 26 along a first direction X, and each of the restraining blocks 203 can abut against the corresponding fixing blocks 26 along a second direction Y, so as to restrain each of the engaging components 23 from moving relative to the corresponding locking slot 202 along the first direction X and the second direction Y. The first direction X can be perpendicular to the second direction Y. Specifically, the first direction X can be parallel to a longitudinal direction of the carrycot body 10, i.e., a longitudinal direction of the carrycot 100, and a transverses direction of the base 200. The second direction Y can be parallel to a transverse direction of the carrycot body 10, i.e., a transverses direction of the carrycot 100, and a longitudinal direction of the base 200. A longitudinal direction of each of the engaging components 23 can be parallel to the first direction X, that is, the longitudinal direction of each of the engaging components 23 can be parallel to the longitudinal direction of the carrycot body 10, i.e., the longitudinal direction of the carrycot 100.

Furthermore, as shown in FIG. 3, the carrycot 100 not only can be detachably installed on the base 200, but also can be detachably installed on a carrier frame when it is detached from the base 200, so a child carrier is jointly formed by the carrycot 100 and the carrier frame. Therefore, the carrycot 100 is versatile. Specifically, the child carrier can be a stroller or a crib, and the carrier frame can be a stroller frame or a crib frame.

As shown in FIG. 3 to FIG. 6, the carrycot 100 further includes two first connecting components 102. The carrier frame includes two second connecting components for respectively cooperating with the two first connecting components 102. The carrycot 100 is detachably installed on the carrier frame by cooperation of the two first connecting components 102 and the two second connecting components. Specifically, the two first connecting components 102 are respectively disposed on the two lateral pipes 22 of the bracket body 2A, and the two second connecting components are respectively disposed on two lateral portions of the carrier frame. Each of the first connecting components 102 can be engaged with or disengaged from the corresponding second connecting component, for the purpose of attaching or detaching the carrycot 100 from the carrier frame. However, the structures and the numbers of the first connecting component and the second connecting component are not limited to this embodiment. For example, in another embodiment, the two first connecting components can be disposed on two lateral portions of the carrycot body respectively. Alternatively, in another embodiment, the carrycot can include only one first connecting component disposed on the bottom portion of the carrycot body, and carrier frame can include only one second connecting component located at a position corresponding to the first connecting component.

Comparing with other approaches, in one or more embodiments of the present invention, the engaging component is used for positioning the carrycot body, and the mounting assembly is used for installing the harness. Therefore, the advantages of one or more embodiments of the present invention are simple structure and easy operation. One or more embodiments of the present invention also provides a comfortable and safe environment for the child. Besides, the carrycot provided by one or more embodiments of the present invention can be adapted for installing on various vehicle seats, such as car seats, ship seats or aircraft seats. The carrycot provided by one or more embodiments of the present invention can also be adapted for installing on various carrier frames, such as stroller frames or crib frame. Therefore, the carrycot provided by one or more embodiments of the present invention is versatile. Furthermore, in one or more embodiments of the present invention, the carrycot body can be made of foam material, and the mounting bracket includes the pipes. Thus, the structure of the carrycot provided by one or more embodiments of the present invention is stable, compact, and lightweight.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A carrycot comprising:
a carrycot body for accommodating a child and for a harness to pass though; and
a mounting bracket on an outer surface of the carrycot body, the mounting bracket comprising:
a bracket body, the bracket body comprising:
a bottom pipe, the bottom pipe on a bottom portion of the carrycot body; and
at least one lateral pipe, the at least one lateral pipe on a lateral portion of the carrycot body;
two engaging components configured for positioning the carrycot, the two engaging components on the bottom pipe;
a mounting assembly for the harness to be coupled to, and the harness being coupled to the mounting assembly and passing through the carrycot body; and a rod-shaped reinforcing component disposed between the two engaging components and continuously extending from one of the two engaging components to the other of the two engaging components,
wherein the bottom pipe is a closed loop extending along a periphery of the bottom portion of the carrycot body.

2. The carrycot of claim 1, wherein at least one engaging component of the two engaging components comprises an engaging portion protruding from the bracket body for positioning the carrycot body.

3. The carrycot of claim 2, wherein a fixing portion is formed on at least one end of the engaging portion and is affixed to the bracket body.

4. The carrycot of claim 1, wherein at least one engaging component of the two engaging components is a rod-shaped structure.

5. The carrycot of claim 1, wherein at least one engaging component of the two engaging components and the mounting bracket are integrally formed with each other.

6. The carrycot of claim 1, wherein an installation slot is formed on the carrycot for cooperating with the mounting bracket, and the bracket body is installed on the installation slot.

7. The carrycot of claim 1, wherein the mounting bracket comprises: the bottom pipe, the at least one lateral pipe, and further pipes.

8. The carrycot of claim 1, wherein the bottom pipe and the at least one lateral pipe are integrally formed with each other.

9. The carrycot of claim 1, further comprising a handle movably connected to the carrycot body or the mounting bracket.

10. The carrycot of claim 1, wherein the mounting assembly comprises a shoulder strap mount and a crotch strap mount configured for mounting a shoulder strap and a crotch strap of the harness respectively.

11. The carrycot of claim 10, wherein at least one first shoulder strap hole is formed on the shoulder strap mount, at least one second shoulder strap hole is formed on a bottom portion of the carrycot body, and the at least one first shoulder strap hole is aligned with the at least one second shoulder strap hole.

12. The carrycot of claim 10, wherein at least one first crotch strap hole is formed on the crotch strap mount, at least one second crotch strap hole is formed on a bottom portion of the carrycot body, and the at least one first crotch strap hole is aligned with the at least one second crotch strap hole.

13. The carrycot of claim 1, wherein the mounting bracket further comprises at least one fixing component configured for restraining at least one engaging component of the two engaging components, and the at least one fixing component comprises two fixing blocks respectively on two ends of the at least one engaging component.

14. The carrycot of claim 13, wherein the at least one fixing component comprises a first fixing component and a second fixing component, the rod-shaped reinforcing component is between one of two fixing blocks of the first fixing component and one of two fixing blocks of the second fixing component, so that the one of two fixing blocks of the first fixing component is affixed to the one of two fixing blocks of the second fixing component by the rod-shaped reinforcing component.

15. The carrycot of claim 13, wherein the mounting bracket further comprises at least one supporting block on an end of the bottom pipe away from the at least one engaging component, and a height of the at least one supporting block from the bracket body is equal to a height of each of the two fixing blocks from the bracket body, so that the carrycot body is supported in a horizontal direction by the at least one supporting block and the two fixing blocks cooperatively.

16. The carrycot of claim 1, wherein the mounting bracket further comprises at least one auxiliary reinforcing component between the mounting assembly and the bracket body, so that the mounting assembly is affixed to the bracket body by the at least one auxiliary reinforcing component.

17. The carrycot of claim 1, wherein the carrycot body is made of foam material.

18. The carrycot of claim 1, wherein a longitudinal direction of at least one engaging component of the two engaging components is parallel to a longitudinal direction of the carrycot body.

19. A carrycot structure for a vehicle seat, the carrycot structure comprising a base and a carrycot detachably installed on the base, wherein the carrycot comprises:

a carrycot body for accommodating a child and for a harness to pass though; and a mounting bracket on an outer surface of the carrycot body, the mounting bracket comprising:

a bracket body, the bracket body comprising:

a bottom pipe, the bottom pipe on a bottom portion of the carrycot body; and at least one lateral pipe, the at least one lateral pipe on a lateral portion of the carrycot body;

two engaging components configured for positioning the carrycot, the two engaging components on the bottom pipe;

a mounting assembly for the harness to be coupled to, and the harness being coupled to the mounting assembly and passing through the carrycot body; and a rod-shaped reinforcing component disposed between the two engaging components and continuously extending from one of the two engaging components to the other of the two engaging components, wherein the bottom pipe is a closed loop extending along a periphery of the bottom portion of the carrycot body.

20. The carrycot structure of claim 19, wherein at least one locking component protrudes from the base and is configured for cooperating with at least one engaging component of the two engaging components, and a locking slot is formed on the at least one locking component and configured for engaging with the at least one engaging component.

21. The carrycot structure of claim 19, wherein at least one restraining block protrudes from the base and is configured for restraining a movement of the carrycot relative to the base.

22. The carrycot structure of claim 19, wherein the rod-shaped reinforcing component is configured to restrain a movement of the carrycot relative to the base by abutting against the base when the carrycot is detachably installed on the base.

23. The carrycot of claim 1, wherein the carrycot is configured to be detachably installed on a base, and the rod-shaped reinforcing component includes two ends configured to abut against the base when the carrycot is detachably installed on the base.

\* \* \* \* \*